US012762687B1

(12) United States Patent
Piety et al.

(10) Patent No.: US 12,762,687 B1
(45) Date of Patent: Oct. 13, 2026

(54) REPETITIVE VIDEO MONITORING OF INDUSTRIAL EQUIPMENT BY MOBILE DATA ACQUISITION UNITS

(71) Applicant: RDI TECHNOLOGIES, INC., Knoxville, TN (US)

(72) Inventors: Kenneth Ralph Piety, Knoxville, TN (US); Jeffrey R. Hay, Prospect, KY (US); Mark William Slemp, Tellico Plains, TN (US)

(73) Assignee: RDI TECHNOLOGIES, INC., Knoxville, TN (US)

( * ) Notice: Subject to any disclaimer, the term of this patent is extended or adjusted under 35 U.S.C. 154(b) by 0 days.

(21) Appl. No.: 19/225,299

(22) Filed: Jun. 2, 2025

Related U.S. Application Data

(63) Continuation of application No. 18/537,074, filed on Dec. 12, 2023, now Pat. No. 12,322,083, which is a continuation of application No. 18/071,130, filed on Nov. 29, 2022, now Pat. No. 11,861,820, which is a continuation of application No. 17/824,230, filed on May 25, 2022, now Pat. No. 11,551,345.

(51) Int. Cl.

| | |
|---|---|
| ***H04N 5/77*** | (2006.01) |
| ***G06T 7/00*** | (2017.01) |
| ***G06T 7/20*** | (2017.01) |
| ***H04N 7/18*** | (2006.01) |
| ***H04N 23/60*** | (2023.01) |
| *H04N 23/90* | (2023.01) |

(52) U.S. Cl.
CPC .............. *G06T 7/0004* (2013.01); *G06T 7/20* (2013.01); *H04N 5/77* (2013.01); *H04N 7/188* (2013.01); *H04N 23/64* (2023.01); *G06T 2207/10016* (2013.01); *G06T 2207/20104* (2013.01); *G06T 2207/30184* (2013.01); *G06T 2207/30232* (2013.01); *H04N 23/90* (2023.01)

(58) Field of Classification Search
None
See application file for complete search history.

(56) References Cited

U.S. PATENT DOCUMENTS

| | | | |
|---|---|---|---|
| 11,551,345 | B1 | 1/2023 | Piety et al. |
| 11,861,820 | B1 | 1/2024 | Piety et al. |
| 2010/0045647 | A1 | 2/2010 | Kim et al. |

(Continued)

OTHER PUBLICATIONS

Ma, “Data-driven decision-making for equipment maintenance” (Year: 2020).*

*Primary Examiner* — Eileen M Adams
(74) *Attorney, Agent, or Firm* — Bricker Graydon Wyatt LLP; Stephen C. Hall

(57) ABSTRACT

Systems and methods are provided to perform PdM surveys using data acquisition units which screen multiple locations where equipment or structures to be evaluated are present. Video data will be acquired and processed to measure translational and vibratory motion and additional data will be collected from other camera, sensors or via data links. The motion present in the equipment or structures under test and the supplemental data will be automatically evaluated to detect suspect equipment conditions and to minimize the amount of video data maintained on the data acquisition unit and transmitted back the central PdM server for review by a PdM analyst and long term archival.

18 Claims, 10 Drawing Sheets

(56) References Cited

U.S. PATENT DOCUMENTS

| | | | | |
|---|---|---|---|---|
| 2010/0235037 | A1* | 9/2010 | Vian | G07C 5/0808 702/183 |
| 2016/0171303 | A1 | 6/2016 | Moore et al. | |
| 2016/0253472 | A1* | 9/2016 | Pedersen | A61B 5/0013 705/2 |
| 2019/0347923 | A1* | 11/2019 | Mckinley | G08B 21/187 |
| 2021/0045647 | A1* | 2/2021 | Barnacka | A61B 5/021 |
| 2021/0240202 | A1* | 8/2021 | Yesh | B66F 9/063 |
| 2022/0089237 | A1 | 3/2022 | Sverdlov et al. | |

* cited by examiner

REPETITIVE VIDEO MONITORING OF INDUSTRIAL EQUIPMENT BY MOBILE DATA ACQUISITION UNITS

CROSS REFERENCE TO RELATED APPLICATIONS

This patent application is a continuation application which claims benefit of and priority to U.S. Nonprovisional Utility patent application Ser. No. 18/537,074 filed Dec. 12, 2023, and issued as U.S. Pat. No. 12,322,083 on Jun. 3, 2025, which was a continuation application claiming benefit from U.S. Nonprovisional Utility patent application Ser. No. 18/071,130 filed Nov. 29, 2022 and issued as U.S. Pat. No. 11,861,820 on Jan. 2, 2024, which was a continuation application claiming benefit from U.S. Nonprovisional Utility patent application Ser. No. 17/824,230 filed May 25, 2022 and issued as U.S. Pat. No. 11,551,345 on Jan. 10, 2023, the contents of all of which are fully incorporated herein by reference.

BACKGROUND

The measurement of dynamic motion from civil structures, machines, and living beings using video recordings from cameras has gained wide acceptance since 2010. The camera offers the advantages of being a non-contact sensor and provides information from millions of pixels simultaneously with broad spatial coverage. This use of cameras to measure motion has proven to be highly effective in troubleshooting machinery problems.

The light intensity measured at each pixel is a result of the light reflected from the objects in the field of view (FoV) in the visible light range or radiation emitted from the objects due to temperature in the infrared portion of the electromagnetic spectrum. In the visible light range changes of the light intensity can be related to the motion of objects in the field of view. In some cases, a fundamental unit of measurement is displacement and the available accuracy achieved using video recordings is a tenth of a mil or better. The application of mathematical techniques to magnify the motion and the ability to modify the frame rate on replay of the recorded video allows technicians to visually present the motion of concern and provides powerful arguments about what is happening and the need for repair to decision-makers who may have limited technical understanding of the underlying physics of the fault condition.

Prior to the use of video measurements of motion, the common practice was to use sensors such as accelerometers or proximity probes to measure the motion at each point of interest. Frequently, when monitoring a machine such as a motor-pump combination, a technician might measure the motion in all three axes, horizontal, vertical, and axial directions, at each bearing housing. This process would yield a set of twelve measurements, on a four-bearing machine during a routine vibration check. When troubleshooting, a more extensive set of readings might be collected at other positions on the machine train or its supporting structure or foundation. This data is typically analyzed by reviewing the time waveform data and the frequency spectrum at each of the positions and axes at which data is collected. Similarly, analyzing motion using cameras has been applied in troubleshooting applications where an analyst uses visualizations of the objects in motion and analytical measurements of the vibration motion to identify the fault conditions.

This technique of individually comparing dynamic data at each location of interest with other locations or historical data is tedious and requires a good deal of expertise which is usually acquired over a period of years. This approach is manageable when the number of readings is limited, for example less than 30 measurements. However, dynamic measurements using a camera often produces data from millions of pixels. This makes the method of manually comparing readings at each pixel or even a set of composite pixels challenging or impractical. Although some pixels may not provide useful or meaningful information, there is the need to identify a workable technique to accelerate the ability of the analyst to efficiently screen the data from millions of pixels and quickly determine what are the significant frequencies of interest and where are they present spatially on the recorded images. Video measurement systems, such as the IRIS® MOTION AMPLIFICATION® System (RDI Technologies Inc. (Knoxville, Tennessee), allow the user to identify a region of interest, ROI, using a graphical user interface. Both in these systems and in the present embodiments, an ROI can be considered as a user-selected portion of a field of view in a video recording. When using a video measurements system such as the IRIS system cited herein, the system software calculates the dominant motion in the ROI and presents time waveform graphs with a cursor synchronized to the frames of the video as well as frequency spectra of the motion. A typical troubleshooting application may last from an hour to a couple of days where a technician takes numerous videos as he tracks the vibration of concern from different spatial vantage points or during different operating conditions. It is common to generate video recordings which require 50-100 gigabytes of storage.

Other patents of direct relevance are U.S. Pat. No. 9,704, 266 (Jul. 11, 2017), U.S. Pat. No. 10,712,924 (Nov. 11, 20190), and U.S. Pat. No. 10,521,098 (Dec. 31, 2019), each of which is titled "Non-contact Monitor for Bridges and Civil Structures," the contents of which are fully incorporated herein by reference. These patents address routinely monitoring various types of civil structures using video data sometimes in combination with other sensors. Civil structures (sometimes referred to simply as "structures" for brevity) include, but are not necessarily limited to, bridges, overpasses, buildings, and structural scale models, for example as may be used for seismic testing. Many systems for evaluation of equipment or civil structures are commonly used by a technician who selects the spatial locations to be monitored on the structure and where all of the video data collected would be stored in a database. In the methods or systems described in these patents, a user is expected to collect or review all of the collected data. This approach is quite effective when monitoring the behavior at known points of interest or for manually troubleshooting or screening equipment or civil structures on an infrequent basis. However, there is yet room for improvements when screening a complex scene with many elements in motion exhibiting multiple frequency components or when making frequent periodic measurements to detect deteriorating conditions.

There is a desire to routinely perform equipment surveys in industrial facilities detecting changes in normal operation behavior and taking maintenance actions based on the condition of the operating equipment or supporting physical structures. This type of proactive maintenance strategy is referred to as condition-based maintenance (CBM) or predictive maintenance (PdM). PdM is the term that will be used herein. Historically, this has been accomplished by performing routine surveys of the equipment of concern using portable data collectors and accelerometers to measure the vibration or installing permanent sensors to gather the data periodically to determine the health of the equipment. Other common measurements in addition to vibration include temperature, electrical current or discharges, ultrasonic readings, physical properties of lubricant samples, and process or environmental variables. The variables monitored for PdM purposes are usually collected on a periodic basis that varies from quarterly or monthly down to a frequency of minutes. The purpose of these PdM systems is early detection of incipient failures which once detected can be used to schedule corrective maintenance actions at an optimum time to prevent production losses. Detecting events in real time that require immediate action is not the objective of PdM surveillance activities; this type of monitoring is performed by a control system or a safety shutdown system as part of plant operation and production.

A single video recording collected to monitor equipment may result in a 1-2 Gigabytes of data. In a facility, where five hundred machines are being monitored, collecting one recording per day, the total cumulative storage for the data collected in a single month would be 15-30 Terabytes. Typically, PdM programs keep data for many years to be able to detect developing trends. In addition to the extremely large storage requirements associated with maintaining video recordings, manually reviewing this volume of data would require substantial labor by a skilled analyst. The review of video recording always begins with a qualitative screening by an analyst and is followed by more detailed evaluations of vibration waveforms and spectra at selected spatial locations. There are no well accepted automated methods for screening video data to detect equipment anomalies in an industrial facility.

Another drawback to using video data to screen equipment in industrial complexes is that the displacement measurements derived from the vibration motion detected in the video data is most suited for identifying frequencies below 400 Hz due to camera frame rates and the dynamic range of displacement measurements at higher frequencies. There are additional measurements that are more sensitive to higher frequency faults which can be performed with non-contact sensors such as airborne acoustic or ultrasonic measurements. There are also other non-contact sensors such as infrared sensors or cameras and electrical probes that are sensitive to other types of faults. In combination with vibration, these sensors provide a more comprehensive picture of the mechanical health of the equipment being surveyed. Although it is difficult for a technician to manually perform PdM surveys with a large number of sensors, this would not be difficult for a mobile data acquisition unit (DAU) transported by a robot or an unmanned aerial vehicle (UAV). Mobile DAUs and automated screening methods would reduce the human labor required to execute a PdM program and provide a greater return on investment when implementing such programs. Accordingly, there is a need for greater efficiency in acquiring and processing large volumes of sensed information obtained from the motion of machines through the development of automated data acquisition systems that reduce human review and require lesser storage capacities.

SUMMARY

The embodiments herein are directed to a system and methods for implementing a PdM surveillance program that automatically collects and screens video recordings, and optionally other measurements, to determine if suspect conditions exist and whether the video recording will be retained for more detailed review. Suspect conditions are anomalous motion or behavior of a piece of equipment or component that may be associated with vibrational anomalies or other irregular or misaligned movements that can be a predictor of early problems, early need for maintenance, or early failure.

For industrial plants in a reasonable state of repair, experience indicates that less than 5% of the equipment being monitored would be experiencing incipient problems. If automated screening methods can identify developing fault conditions and video data is selectively stored when a fault condition is detected, this would reduce by a factor of twenty the required storage and the need for an analyst to manually review the data. If video recordings are retained only when a significant deterioration in the detected fault, then the storage requirements are reduced even further. Thus an automated methodology for screening video data is necessary to implement routine surveillance programs to minimize human review and storage requirements.

Video cameras, along with other non-contact sensors, can be mounted on robots or UAVs, or multiple cameras may be mounted in fixed locations, possibly using rotating/articulating mounts. In all such applications, the embodiments described herein meet a significant need for methods to ensure that high quality repeatable data to be acquired, to process this data automatically, to detect changes from normal motion in the field of view, and to selectively store the video data for review by a human analyst. Embodiments of these methods to implement a PdM program offers significant reductions in labor for PdM staff and reduce the amount of time required of a human analyst.

BRIEF DESCRIPTION OF FIGURES

The drawings, schematics, arrangements, figures, and descriptions contained in this application are to be understood as illustrative of steps, structures, features, and aspects of the present embodiments. Accordingly, the scope of embodiments is not limited to features, dimensions, scales, and arrangements shown in the figures.

MULTIPLE EMBODIMENTS AND ALTERNATIVES

Figure 1:
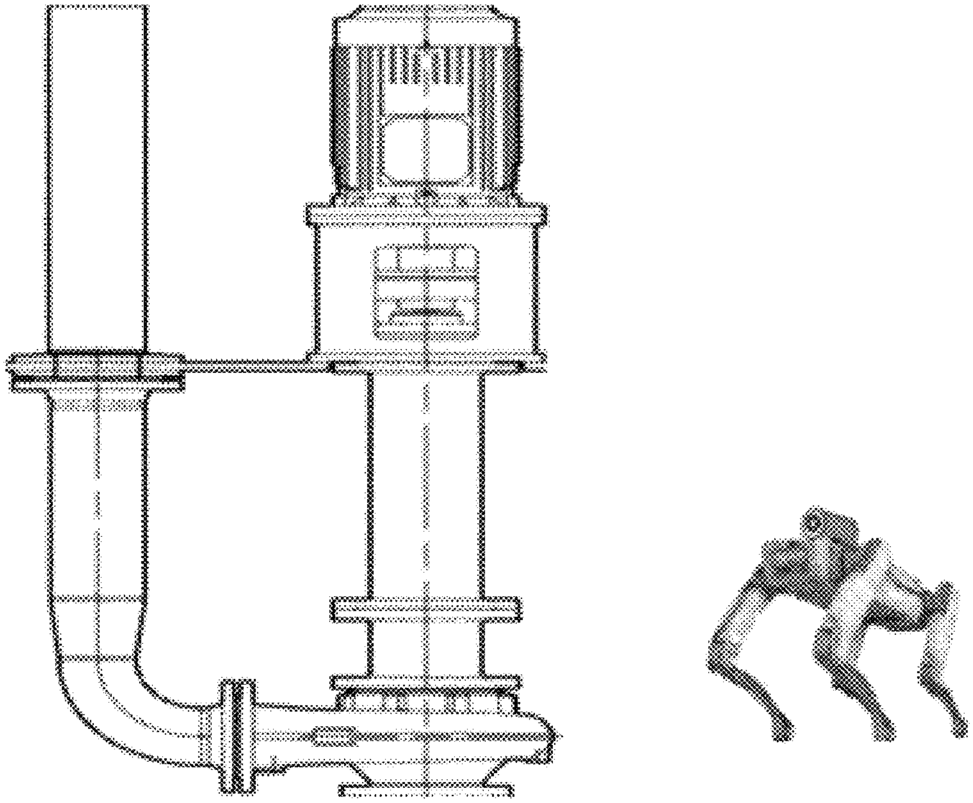
FIG. 1 illustrates a conventional quadruped robot outfitted with a video camera which is collecting data in a power plant.

In some embodiments within the scope of subject matter claimed herein, a system is provided for evaluating equipment or civil structures undergoing motion on a periodic interval as defined by a PdM program. When sampled data is acquired, such as with a video acquisition device, the data may exist in a video recording having a plurality of video images of the moving object which are divisible into individual video image frames, and with each frame being divisible into a plurality of pixels. Such a system may comprise one or more video acquisition devices, such as but not limited to one or more video cameras, webcams, or digital cameras integral in cells phones. In this way, one or more video acquisition devices may be positioned with an unobstructed view of a selected portion of an object to obtain a video recording of the object in motion. Also, such a system or method may comprise or utilize a processor and a memory for storage of the individual video image frames as well as any that are modified through the processes described herein, and a computer program operating in the processor, as well as one or more video acquisition devices.

Embodiments are not limited to a particular type of video acquisition device, but may include one or more video cameras, webcams, or digital cameras sensitive to other wavelengths in the electromagnetic spectrum. A video acquisition device in the embodiments herein may be configured with an adjustable frame rate that allows the video images to be acquired at a sampling rate that is sufficient to capture a plurality of frequencies present in the periodic motion. That is, video images are acquired by a video acquisition device at a rate expressed in frames per second (fps), wherein for example at 120 fps there would be 1200 frames acquired in 10 sec. A computer program in the embodiments herein comprises computer-readable program instructions executed by the processor and may be configured to operate on a subset of pixels from the plurality of pixels in a field of view of the video recording.

A system in accordance with present embodiments, when collecting PdM, may be augmented with data input from other sensors including infrared cameras, airborne or contact ultrasonic sensors, accelerometers, or force sensors, electric current or voltage sensors, flux coils, electrical discharge sensors or Hall effect probes, tachometers, and other process or environmental measurements appropriate to specific applications and arranged as a sensor payload on a particular data acquisition unit. These sensors may represent data that is desired in combination with the vibration information collected by the cameras to detect incipient fault conditions, or they may serve as trigger sources which determine if data is to be collected and reviewed. In other cases they may be used to establish operational states of the equipment under test to be used by the fault detection algorithms to improve accuracy under variable operating conditions. Installed wired sensors may be used when the camera is mounted at a fixed location, but noncontact sensors or wireless installed would be the preferred choice for mobile collection units.

Figure 2:
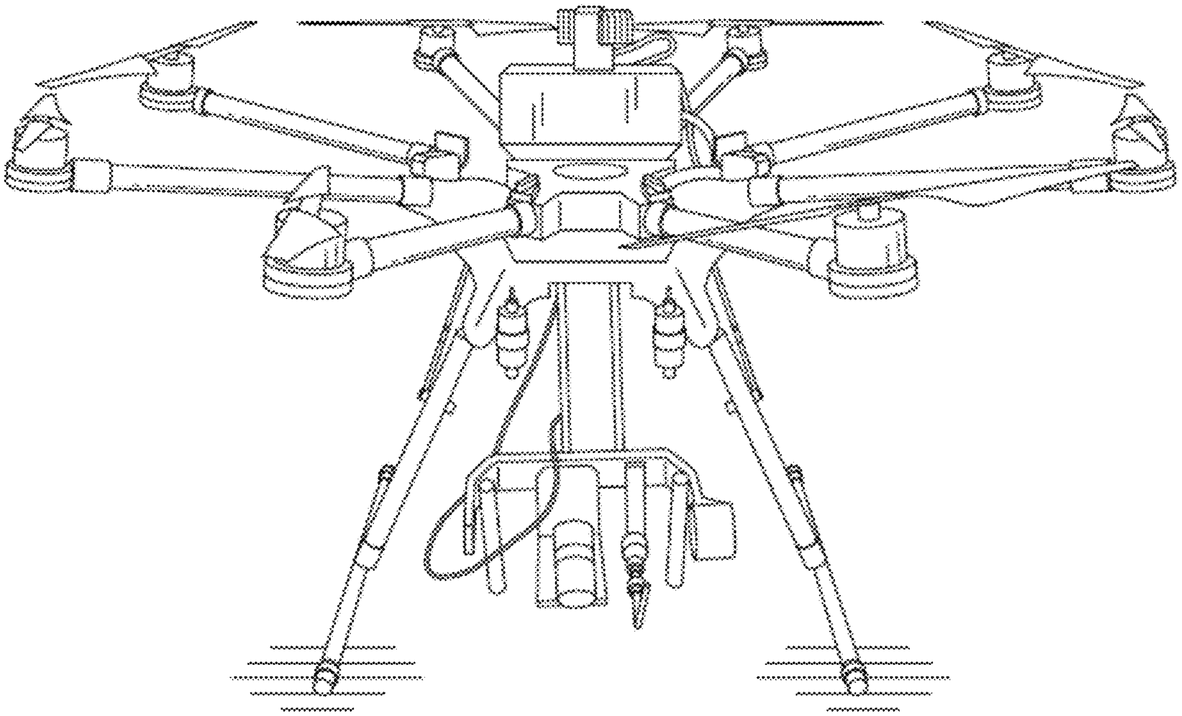
FIG. 2 is a conventional UAV with a video monitoring payload being evaluated by Electric Power Research Institute for power plant applications.
Figure 3:
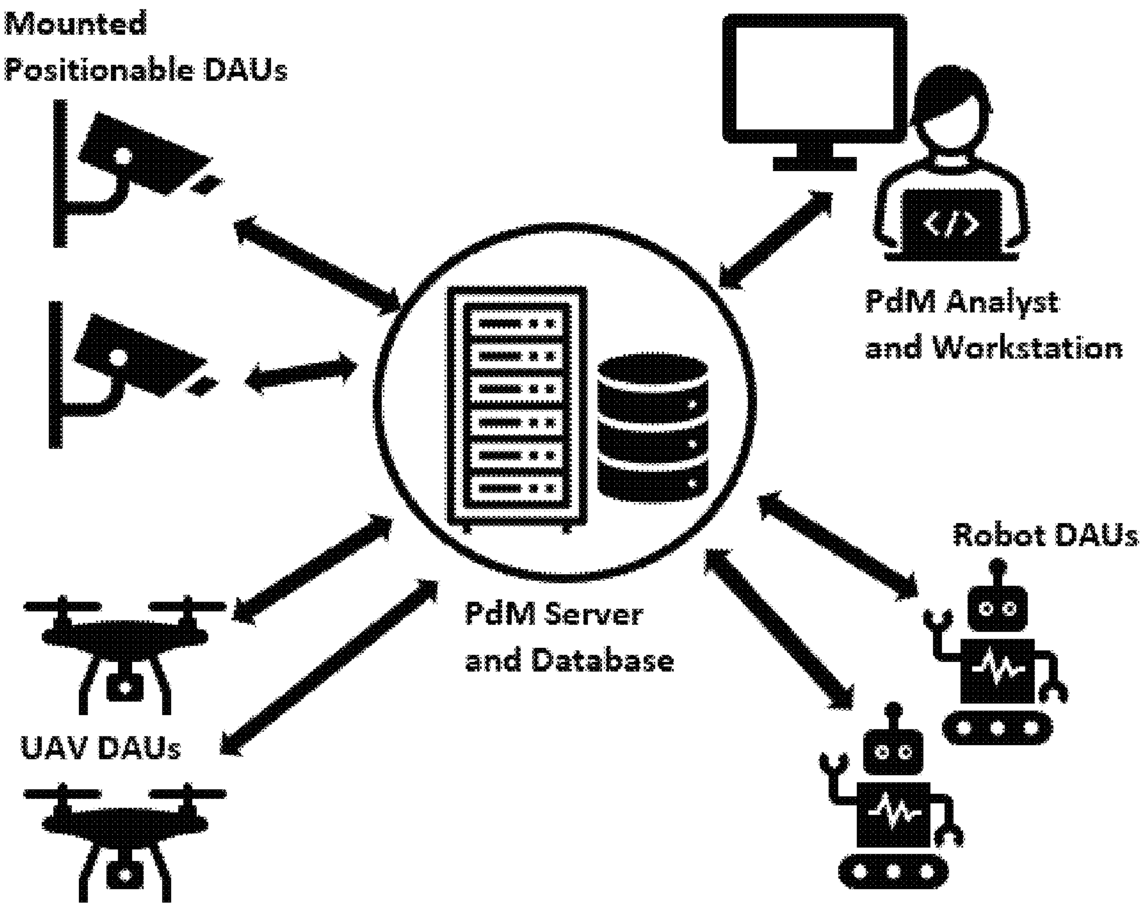
FIG. 3 illustrates a PdM program which has a server that maintains the master PdM database including archived surveyed measurements and a fleet of mobile or positional DAUs with onboard multi-sensor instrumentation package.

When video data is collected from a fixed location with a fixed orientation with a fixed lens and stable lighting, then the data acquisition portion of the monitoring process is simplified. However in the general case, which certainly includes mobile applications, variable lighting, focus and aperture of the camera, distance to the equipment under test, and camera shake must be carefully controlled or determined to make repeatable measurements. As illustrated in FIGS. 1 and 2 robots and UAVs are commercially available to transport the sensor monitoring payload to the test location. For installed data acquisition units, panoramic rotational and pan/tilt mounts are available to allow the sensor payload to be pointed in the proper direction under computer control. The technology that enables robots or UAVs to follow programmed routes is not part of this invention and is provided by the vendors of such equipment. Examples of such companies are Boston Dynamics which manufactures the quadruped shown in FIG. 1 or DJI which sells the Spreading Wings S1000 shown in FIG. 2. The robot and UAV vendors provide sophisticated tools to program their devices to follow specific routes and pause at predefined locations to collect data.

Some survey sites may have landing structures that the mobile DAUs will locate and position themselves upon the structure during the survey measurements. The landing structure could be a simple flat platform, or a mechanical structure formed to mate with the one of more sections of body of the mobile transport vehicle. In some embodiments, the mobile transport vehicle might be secured magnetically to the landing structure, or a mechanical clamping mechanism might be used to secure the transport vehicle. In some embodiments, the landing stations might be intelligent and communicate with the mobile transport vehicle to engage and disengage the latching mechanism. Installations such as these would require power and a preferable embodiment would use solar panel or an energy harvesting mechanism to maintain the charge on a battery. When using a landing structure, the DAU may turn off all motors and navigation electronics that consume power and contribute to camera shake. This methodology offers potential to achieve higher accuracy measurements and reduce the power required to execute a survey or allow more equipment to be monitored during a survey.

Figure 4:
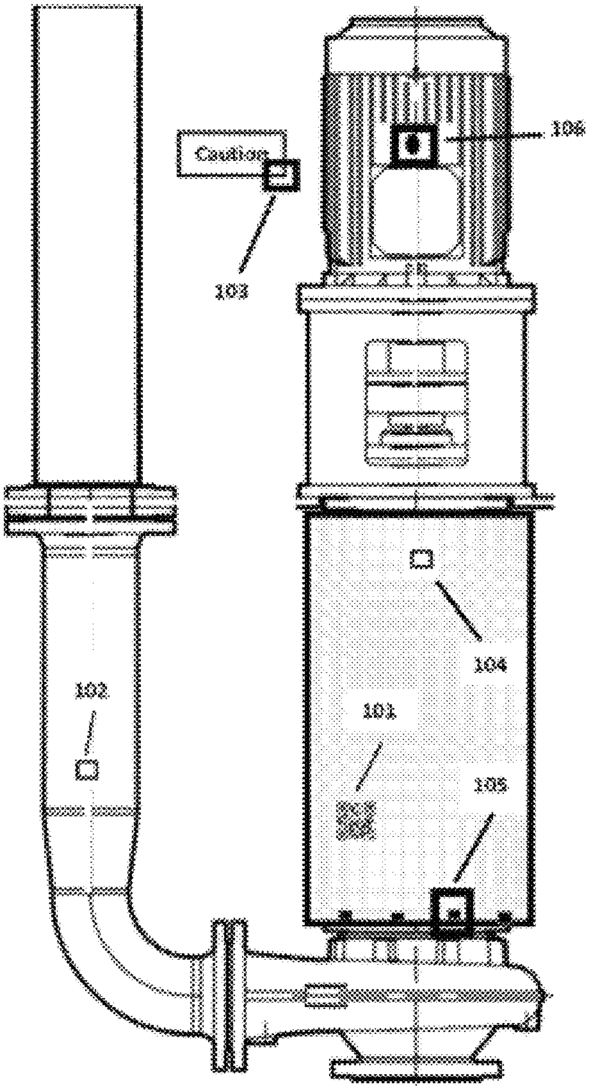
FIG. 4 presents a frame from a video recording collected by a mobile DAU which has both a QR code fiducial mark, mounted rectangular targets, and superimposed spatially determined measurement locations identified by the rectangles with thick borders, to illustrate an aspect of practicing multiple embodiments and alternatives herein.

In some embodiments within the scope of the present disclosure, a PdM system is configured to monitor many locations in one or more geographically diverse plant sites as illustrated in FIG. 4. The specification defining what measurements are to be acquired and how each location is to be screened is established by the PdM program manager or analyst, and this information is stored in a database on the PdM program server. This PdM server may be in a physical or cloud-based data center and the fleet of DAUs may be distributed at one or more physical sites. The DAUs may consist of mobile units attached transported by robots or UAVs or DAUs mounted at fixed sites which can be electronically positioned to perform surveys of multiple locations with equipment or structures to be evaluated. The DAUs will include an instrument package that supports multiple sensors at least one of those sensors being a video camera that can make dynamic measurements of the motion of the objects in the FoV at each test location. In some embodiments one or more of the optional sensors will be aligned such that line of view of the video camera such that data from these other sensors may be overlayed upon a visual image. In other alternate embodiments, a laser point may be used to identify the location of a fault detected by another sensor on a visual image recorded by the video camera.

In one of the preferred embodiments, one or more fiducial marks are located in the field of view of the camera at each monitoring site as shown in FIG. 4. The fiducial marks, labelled 101 through 104, can serve several functions. They may contain equipment identifiers or QR codes, such as 101, which confirms the identity of the test location. The fiducial marks also contain line segments of a known length that can establish the mm/pixel calibration from the exact testing position. The sides of the perimeter surrounding 101 or the sides of the squares in 102-104 are a known precise length and can provide precise calibration as the software exactly determines the pixels falling at the endpoints of the respective sides. Fiducial marks can also serve as test locations themselves or as reference points from which other spatial regions of interest (ROIs) are established for test measurements. The rectangular ROIs labelled as 105 and 106 are examples of these graphically defined spatial measurement locations. Measurement ROIs may be located on the test object or a nearby stationary structure to aid in stability corrections applied to the video data to remove camera shake. The target labelled 103 is attached to a structural wall behind the equipment under test and can be used to determine the amount of camera shake present and to remove this motion by applying stabilization algorithms to the video recording. The fiducial marks also represent the maximum contrast available since they contain pure white and black colors on adjacent pixels. They can also be used in algorithms to determine if adequate lighting is present or to adjust the external lighting included as part of the mobile monitoring system or mounted supplemental lighting that can be controlled wirelessly to achieve an acceptable level of brightness in the recorded video.

Figure 5A:
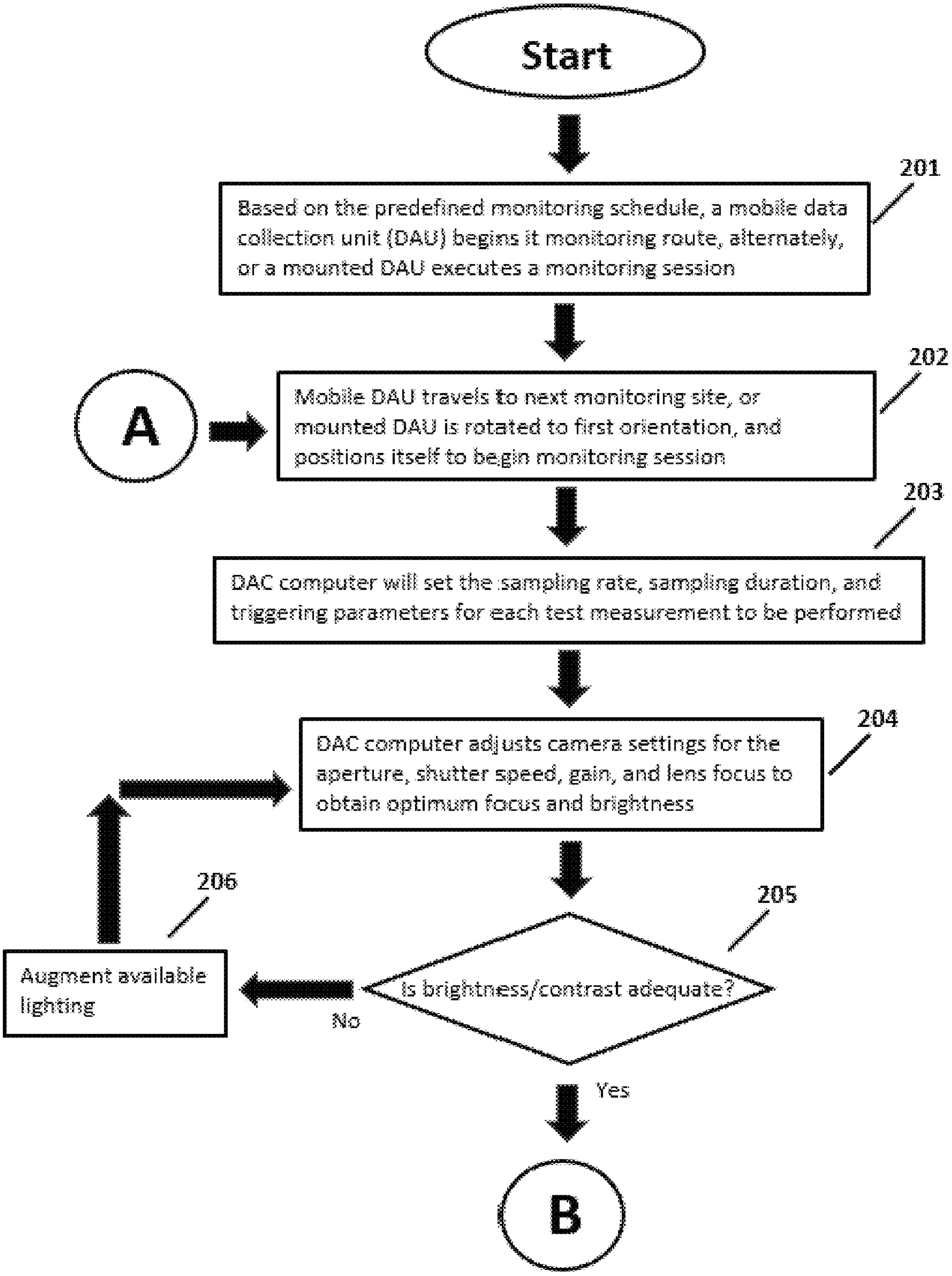
FIG. 5A-C is a flowchart that outlines one preferred embodiment of the PdM survey process according to multiple embodiments and alternatives herein.
Figure 5B:
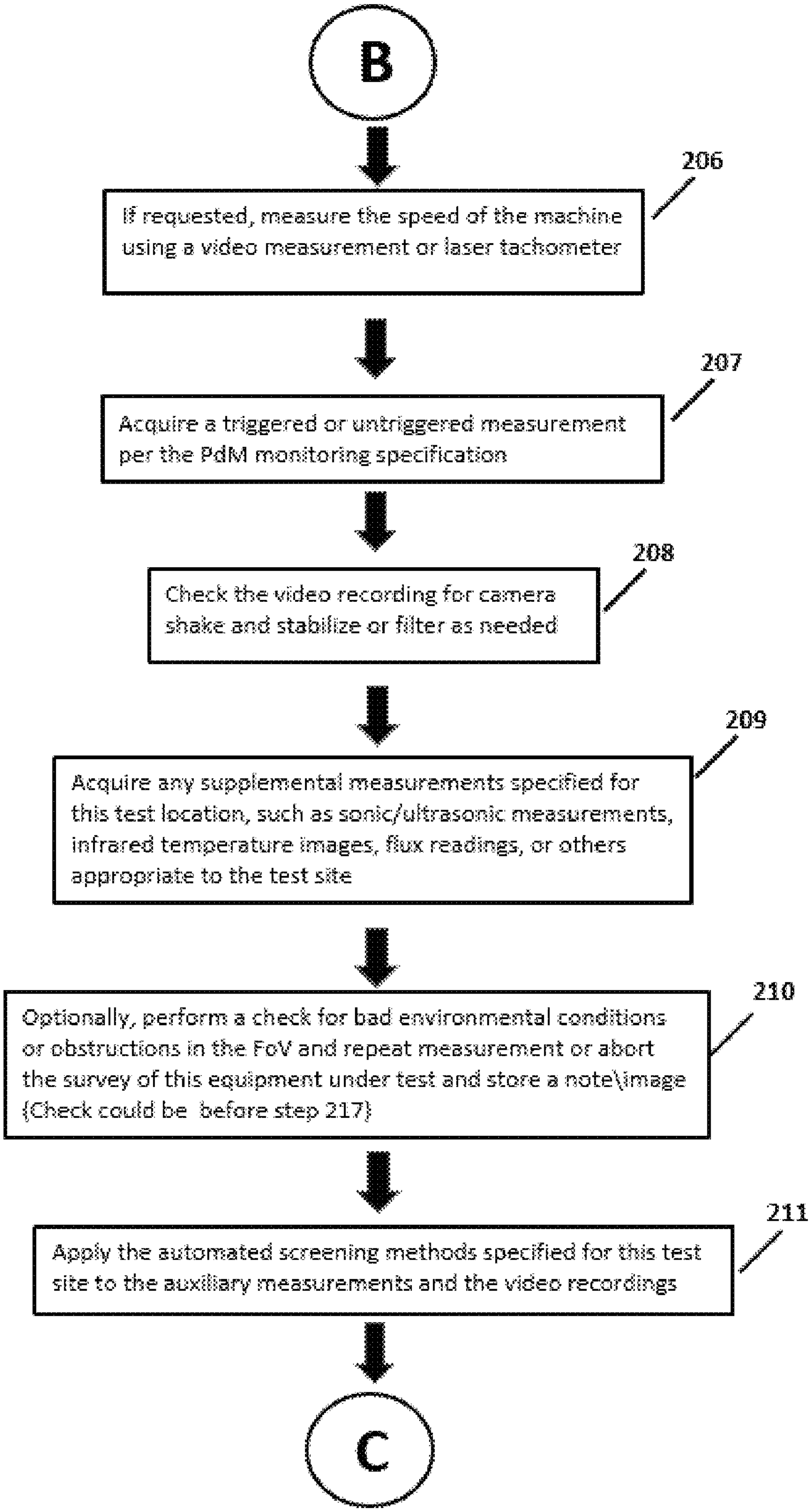
Figure 5C:
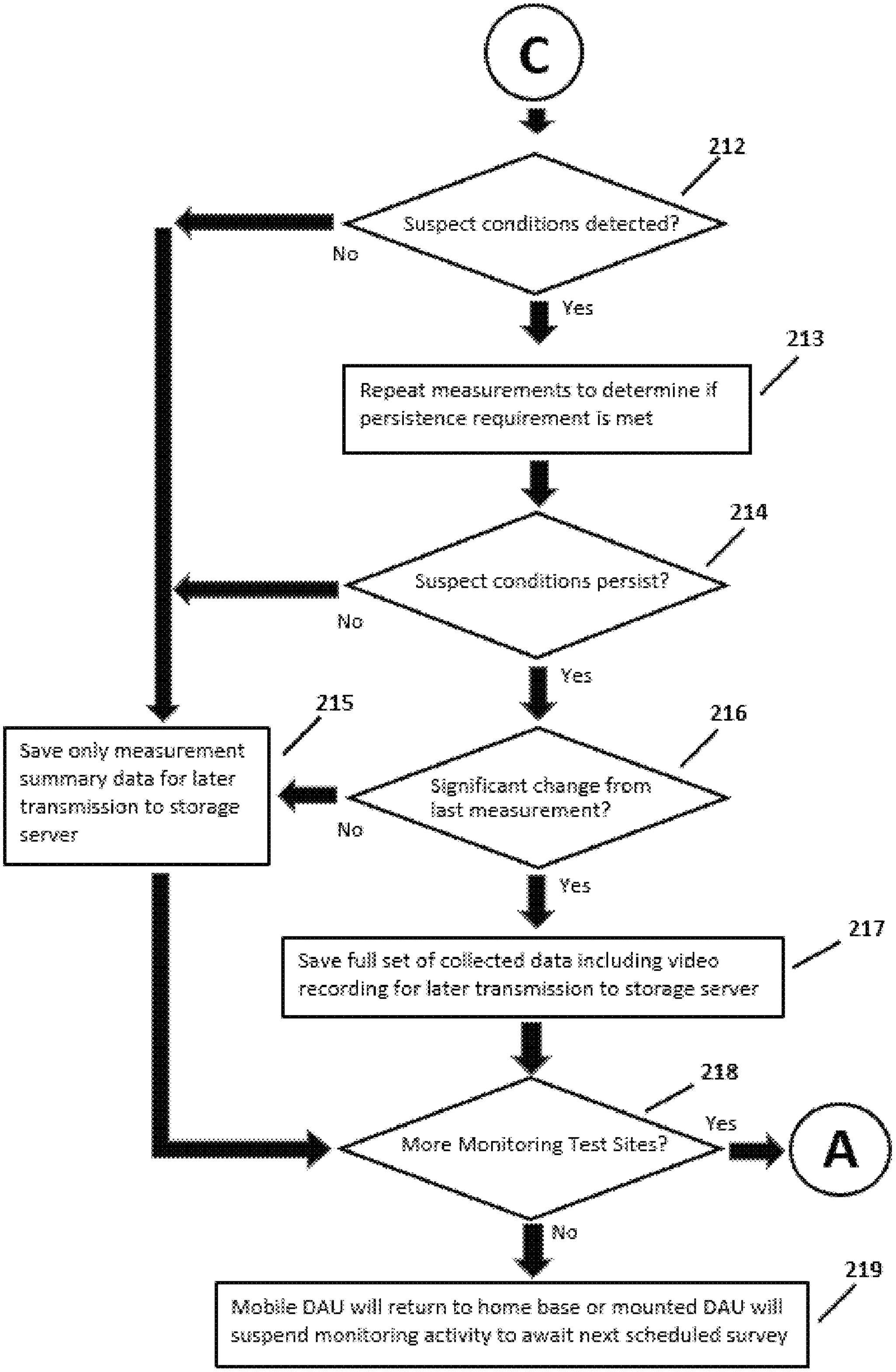

One preferred embodiment of the PdM survey process is outlined in the flowcharts shown in FIGS. 5A-C. A database of predefined settings establishes how data is acquired at each test location as defined in step 201. This PdM database will define the parameters that establish how data is collected, screened, and stored as outlined in Table 1.

Table 1. Predefined Information in the PdM Monitoring Database

1. How frequently data is collected
2. Number of test locations to be collected in the FoV
3. Whether test locations are established by fiducial marks, spatially located ROIs, or by object recognition and/or edge detection techniques
4. Maximum Frequency of analysis for each test measurement
5. Duration of data collection for each test measurement
6. Triggered or non-triggered measurement for each test measurement
7. Trigger source and specification, pre-trigger buffer for each test measurement
8. Other data to be collected, including data that may be needed to establish operational states
9. Screening/Analysis methods to applied
10. What measurements to include in screening data summary
11. Data storage/transmission criteria The data acquisition process employed by each DAU is outlined in the flowcharts provided in FIGS. 5A-C. Once the mobile DAU arrives at the test location or the mounted DAU is activated for a data collection session, the data acquisition (DAC) process is controlled by an onboard DAC computer as indicated at step 202. The DAC computer will set the sampling rate, sampling duration, and triggering parameters for each test measurement to be performed as outlined in step 203. As outlined in steps 204 through 206, the DAC computer adjusts the camera settings for the aperture, shutter speed, gain, and focus of the lens to obtain optimum focus and lighting. If the level of lighting is determined to be insufficient, then the auxiliary light source, if available, will be switched on to add sufficient lighting for the measurement to proceed. The measurement process is described in steps 206 through 209. The DAC computer will make the measurements defined, stabilize or filter the video as needed to remove camera shake, screen the video data as specified, and store data per the data storage specifications. In some applications, a single video recording may be sufficient to capture a good video recording for all measurement locations. In other applications where measurement locations are located at significantly differing distances from the camera, camera settings may need to be adjusted and additional video recordings captured. In some embodiments, the data measured may include machine speeds, vibration waveforms, spectra, cross spectra, and then specific vibration parameters such as maximum peak values, symmetry of the waveform, phase, amplitudes in specific frequency intervals, or amplitudes at the set of N largest frequency peaks at specific measurement locations.

Alternately, the DAU may search for objects in the FoV which match components of interest or have been graphically defined from a video frame or photo during an initial baseline measurement to spatially limit the areas in the FoV that will be screened. In some embodiments as described in step 210, prior to screening the video data, a check may be executed to detect significant changes in the scene being monitored due to bad environmental conditions or obstructions in the FoV. This check can be accomplished by one of several techniques known to those skilled in the art. Typically, one frame or an averaged frame is compared against an equivalent frame collected during a baseline survey. If significant differences are present, then the FoV has been compromised and the survey measurements will not be meaningful. Another set of data may be obtained to repeat the check; however, if the integrity of the scene in the field of view cannot be established, then a note to this effect would be logged along with the compromised image frame and the DAU will move to the next equipment/structure to be tested. As persons skilled in the relevant art will appreciate, this check to prevent the collection of corrupted survey data could be performed at other points in sequence described in this flowchart, such as before the step 217, and remain within the scope of the embodiments described herein.

Motion waveforms will be constructed for individual or groups of pixels, edges, the most distinctive features inside the monitored objects, installed target marks, or spatially defined ROIs and auto or cross frequency spectra will be calculated. Features derived from the individual waveforms or spectra may be calculated or alternately, a composite spectrum constructed and the largest N peaks in the composite spectrum may be located. Data from waveforms with unrealistic amplitude values, such as 100 mils or greater, will be excluded from the measured parameters and/or the composite spectra. Additionally, the features of the waveform may be screened to identify features that indicate an invalid measurement such as a highly skewed, truncated, or step discontinuity characteristics. Waveforms such as these would be ignored but their presence logged to be reviewed by the PdM analyst. As described in step 211, the features and techniques defined for each particular test site will be applied to screen the data for suspect conditions. In some embodiments, exceptional data may trigger that the measurement is repeated and data only retained if the detected suspect conditions persist for M measurements as described in steps 212 through 214.

When monitoring rotating or reciprocating equipment especially those operated at variable speed, the speed of the machine will be measured, if possible. This can be done optically if there are areas of the shaft exposed for the machine under test. When this is not possible, then speed determination algorithms will be applied to the frequency spectrum of the machine to attempt to obtain an accurate value for the speed. This speed value will be used to determine the rotational order of the peaks present in the spectral data which is necessary to accurately screen data and diagnose faults. In other applications, such as monitoring piping, support structures, or stationary equipment such as tanks and vessels, the measurement of speed is not applicable, and the frequencies of interest do not need to be normalized before analysis. In this application, the DAC computer will screen the vibration waveforms or frequency spectra for displacement/velocity amplitudes that user defined or learned alarm limits or changes in other characteristics in the vibration waveform or the presence or emergence of significant peaks in the frequency spectrum. If exceptional values are detected in the screened vibration parameters, then the measurements may be repeated to satisfy a persistence criterion (steps 212-214). In most embodiments, certain summary data will always be returned from test locations as outlined in step 215; however, the video data would only be retained when establishing baseline conditions for new, replaced, or rebuilt equipment or the screening process reveals suspect conditions. Even if suspect conditions are determined to be present after any persistence requirement is met, some embodiments will compare the current measurement against the previous data stored to detect a significant change before the video data will be stored as described in step 216 and 217. The stored data is retained in onboard memory in the DAC computer until a wireless network is available Some or all of the stored data may be transmitted after the measurements are completed at a test site, during a scheduled transmission, when the DAC computer reaches the limits of available memory, or at the completion of a survey. If there are more test sites for the mobile or mounted DAU, then the unit will move to the next test site as described in step 218 or mobile units return to their home station and mounted units suspend monitoring and wait for the next scheduled survey as described in step 219. The home base for a DAU may be at a central monitoring location or may be located remotely in the field. Most of the vendors of the unmanned vehicles or robots provide docking stations which can be installed in a variety of environmental conditions.

Figure 6:
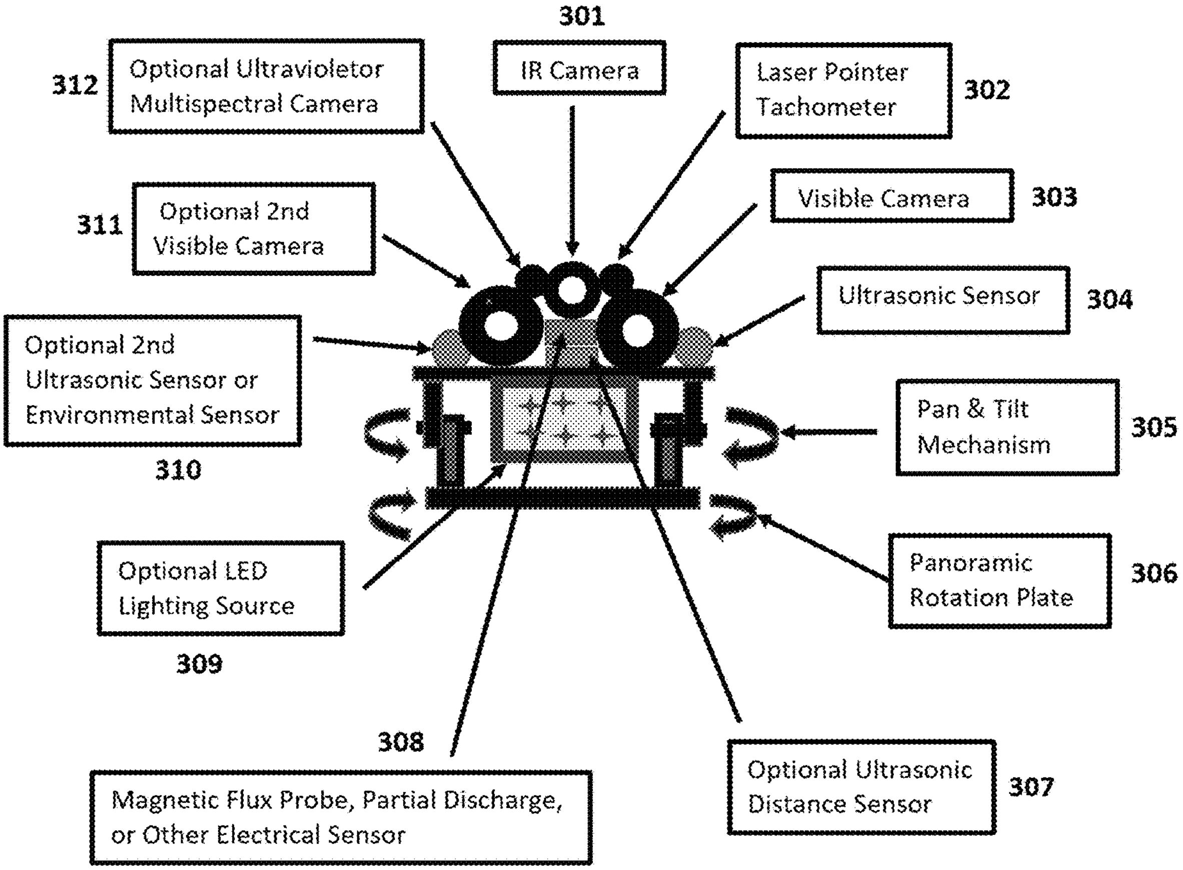
FIG. 6 is a schematic chart of an exemplary embodiment of the instrumentation head mounted to a mobile DAU or installed at a monitoring location to monitor one or more spatial locations according to multiple embodiments and alternatives herein.

In some embodiments, the instrumentation mounted on the DAU may vary depending upon the type of equipment being monitored. In some embodiments, the instrumentation package as a single unit is attached to a simple motorized panoramic rotational, pan/tilt mount in order to have more flexibility for capturing data in three spatial dimensions such as illustrated in FIG. 6 and labelled 305 and 306. In more complex embodiments, individual sensors or sensor groups may be individually mounted on mechanisms to allow independent motion between sensors. In other applications, this flexibility may not be needed, and the mobile DAU may provide enough range of motion such that a rigid mount is sufficient for the instrumentation package. In applications where the instrumentation package is mounted at a fixed spatial location, the motorized panoramic rotational, pan/tilt mount may be used to reduce the number of locations where an instrument package would be installed and reduce the cost and maintenance requirements of the PdM implementation.

FIG. 6 illustrates an exemplary use of a broad range of sensors installed in the instrumentation package. In some embodiments, the specific sensors included in the instrumentation package may be fixed. In other embodiments the sensors included may vary based on the survey to be executed. In this situation, the PdM technician responsible for the mobile DAUs would be alerted by the central PdM server that the next survey scheduled will require an instrumentation change and what sensors or sensor payload is required. Once the Mobile DAU has completed its current survey and returned to its home base, the central server provides a notice to the PdM technician of the time window available for switching to the next set of sensors.

The specific sensors needed will vary depending on the type of equipment or structures to be monitored. If the instrument package is being mounted on a few mobile DAU units, then it may be cost effective to have a full complement of sensors and only activate those measurements specified in the PdM database at each monitoring location. It is preferable to utilize non-contact sensors; however, a mobile DAU might access installed wireless sensors or connect to a wireless communication link provided by the process computer to acquire operational state data. These installed sensors or external process links may serve as triggers for data collection or may provide additional data to supplement the interpretation of the other survey measurements. The applications described herein rely on data from a video camera labelled 303 in FIG. 6. In some embodiments, a second visual camera may also be used to provide stereo visual data as indicated by label 311. The visual camera(s) will supply the dynamic motion data for the equipment or structure under test. The camera(s) should be aligned with other sensors to allow images to be overlayed such as between the IR camera labelled 301 or the optional ultraviolet/multispectral camera labelled 312 and an image from the visual camera. Also, a fault detected by other sensors could be located by the beam of the laser pointer (labelled 302) superimposed on the FOV of the visual camera.

In some embodiments, one or more airborne ultrasonic sensors, labelled 304 and 310, are employed to provide sensitivity to high frequency phenomena such as impacting events, leaks, and electrical discharges, and are useful in monitoring process equipment, electrical equipment, pipes, and steam traps. Multiple ultrasonic sensors can help locate the source of the high frequency events more accurately. The IR camera can capture a single thermal image as well as video of the temperature variations present in its FoV. The detection of unusual temperature conditions is extremely valuable in almost all PdM applications. The magnetic flux probe, a partial discharge, or other electrical sensor labelled 308, are valuable for detecting electrical faults in motors, generators, or power transmission equipment.

The use of multiple sensors attached to the mobile DAU or even a variable position mounted DAU can be extremely advantages to accomplishing a comprehensive screening of the equipment or areas under test and minimizes the time involved in collecting PdM data and the number of survey trips required from mobile DAUs. Furthermore multiple sources of data collected at the same time provide a more comprehensive and interpretable evaluation of any fault conditions present and the severity of the degradation.

In some embodiments, the data collected is based on triggering requirements. In these testing scenarios, the data is captured continuously in a circular buffer and only processed if a trigger occurs. The data collection process allows for the duration of pre- and post-trigger data to be specified in the PdM database. The trigger source can be any signal which can be accessed by the DAU such as a speed signal, process measurement, wired or wireless accelerometer, a sonic/ultrasonic sensor, or an IR temperature sensor. In other embodiments, the trigger source may come from the video signal. There are several types of triggers that can be defined based on the live video signal. One or more ROIs can be defined spatially in the FoV, or mounted targets may serve as the virtual sensors from which one or more triggers can be defined. There is a great deal of flexibility available when specifying a trigger event. The trigger event can be derived based on the overall displacement/velocity measurements calculated from a virtual sensor located in the FoV or the change in those measured parameters. Additionally, frequency-based triggers can be defined based on the displacement or velocity amplitude at a specified frequency or frequency interval. Multiple trigger criteria can be defined on the same virtual sensor or from other sensors. A third method of triggering could result from a change in the pattern of the motion in a ROI. This type of trigger is useful in applications where a repetitive process such as packaging or bottling is occurring, and there is a need to detect jams or other types of process upsets. Another type of trigger could result from a target mounted on a component or a distinctive feature on the component such as a robotic arm which is performing a repetitive operation. The transitory motion can be tracked and a trigger occur at the same point in each cycle or define a trigger based on deviations occurring in the path of the arm from one cycle to the next.

In one of the preferred embodiments, the screening algorithms applied to the video data is user selectable and defined in the PdM database. The screening methodology may differ due to user preference, the type of equipment monitored, or the related production process. The screening methods may include combinations of time waveform parameters, phase readings, or amplitudes at selected frequencies or frequency intervals in a frequency spectrum at selected measurement locations or in a composite frequency spectrum. When screening rotating or reciprocating equipment, it is a preferred practice to screen spatially defined measurement locations. The spatially defined measurement locations are usually positioned close or on the bearing housing of the component machines. These locations will normally be established by a combination of fiducial targets attached to the machine or by ROIs established graphically by the user during the initial setup of the PdM monitoring database. The PdM analyst that defines the PdM surveys will define the motion parameters to be screened at each measurement location. These will include a combination of time waveform parameters, such as RMS, Peak, or PK-PK amplitude, measures of asymmetry, skewness, or kurtosis, or amplitude histograms. Other parameters will be extracted from frequency spectrum features, such as amplitudes at specific frequencies, the amplitude for a frequency interval, or the largest N peaks in the spectrum. The amplitude of vibration may be expressed in displacement or velocity units. Other monitored parameters might be deviations in phase relationships between components or phase differences between two or more locations or changes from a baseline value.

Although rotating or reciprocating equipment might be the main focus at a test site on the survey, there will be additional support/protective structures, piping, valves, tanks, or gauges present in the FoV captured by the visual camera. In some situations, the PdM analyst may elect to define specific spatial locations to be monitored on these objects as described above. However, in other cases, the entire area or spatially limited areas around the rotating/reciprocating equipment may be monitored by screening individual pixels, motion in a pixel grid, the motion of the most distinctive features in the area. Spatial areas analyzed may be established by user definition, object recognition, edge detection, or a combination of these techniques. One or more of the time waveform parameters identified above may be selected as the features to be screened. Additionally, features as described above from the individual frequency spectra may be monitored. In some applications, the composite spectrum from the selected spatial areas may be constructed as defined in the PdM database and frequencies present in the composite spectrum screened to detect incipient problems. Some methods of construction for the composite spectrum will also provide an occurrence count for the number of pixels or spatial features exhibiting this defect frequency. Regardless of the features screened a data test summary will be defined to characterize the state of the equipment under test.

In cases where no rotating or reciprocating equipment is present in the FoV at the test site, the method described above which does utilized specific test measurement locations may be applied to the scene. Certainly when screening rotating or reciprocating equipment, the temperature data from the IR camera and the high frequency information from the ultrasonic sensors is extremely valuable for detecting phenomena associated with antifriction bearings and gears, or loose components. Leaks and steam trap or valve problems are other faults that can be detected using the ultrasonic sensor and IR camera present on the mobile DAU. In some embodiments, a mobile DAU could use multiple ultrasonic sensors and modify the position of the mounting mechanism to pinpoint the location of the leak and use the laser pointer to identify the leak on a visual image.

Objects with unreasonably high motion, such as an instrument tag flapping in the wind or objects moving through the field of view will be logged as a survey note and cause these localized areas to be omitted from analysis. In other instances, the presence of adverse environmental conditions such as weather, lighting, or camera shake may trigger a re-collection of the measured data or prevent the completion of data collection and analysis if severe conditions persist. The condition preventing completion of the survey at a test site will be logged as a survey note along with a visual image.

In other monitoring applications such as robotic arms, stamp presses, or cranes, there is translational motion present which is designed to occur along a repeatable path or can be programmed to perform a repeated test operation. In this case, the path of the translation motion is separated from the vibratory motion which occurs along the path. The repeatability of the translational path can be compared against the original baseline path and features extracted from the waveform and spectrum of the vibratory motion measured over the entire path or for different sections of the path. These features can also be screened to detect deterioration in the operation of the equipment. This type of application may take advantage of triggered measurements based on one or more ROIs defined in the visual image or from one of the supplemental measurements such as an acoustic or ultrasonic sensor.

Another monitoring application where triggered data capture would be important is in packaging or bottling process applications. In this application, the user may establish an amplitude- or frequency-based trigger or a pattern-based trigger from a spatially defined ROI in the FoV of the camera. The video data would be captured in a circular buffer until the pattern present in the ROI changes and then the specified amount of pre-trigger data is retained, and recording continues until the specified post-trigger data is acquired. These triggers could be established based on values specified by the user or learned from observing the process for a period to establish normal behavior. This approach would be necessary for processes that are subject to variable production speeds.

In bridge monitoring applications, the data collection may be triggered using the visual camera on board the DAU or it may be from a mounted accelerometer or a camera that can transmit data wirelessly to the DAU. In these applications, it would be much more informative to collect data when vehicles are on or exiting the bridge. Additionally, it may be important to characterize the type and magnitude of the load being applied to the bridge in order to properly screen the measured data.

Another PdM use case for the mobile DAU or a variable position mounted DAU is electrical switchyards or substations. The substation is an assembly of transformers, switches, power circuits, breakers, electrical lines, and auxiliary equipment to support the transmission of electricity. In this scenario, airborne ultrasonic sensors, electrical sensors, an IR camera, an ultraviolet or multispectral camera, and the visual camera would provide valuable information. The airborne ultrasonic sensors, electrical sensors, and the ultraviolet or multispectral camera would be sensitive to corona or other types of electrical discharge phenomena. The IR camera would provide the ability to detect hotspots on the equipment and the visual camera could detect excessive motion in lines or supporting structures as well as assist in identifying the location of fault detected by the other monitoring devices.

All features extracted from the measured data must be evaluated against alarm limit values. In some cases these limits may be defined by the PdM analyst based on his experience, by previous measurements, or by industry established guidelines. For example, there are guidelines for overall vibration levels which have been established for piping and rotating/reciprocating equipment by industry groups. Similarly, there are guidelines which have been established for temperatures when screening plant equipment and electrical panels using an IR camera. In other cases, it is preferable or necessary to establish baseline values and alarm limits during an initial monitoring period and learn the normal variations that occur in the data. After the learning or training period, the screening will compare new measurements to see if they are outside of the range of normal variation. Learned alarm limits may be different for different operational states if those states can be established by onboard sensors, external wireless measurements, or through data links with production/operational control systems. If the screening begins to detect suspect behavior but it is determined that equipment is behaving normally, then additional learning sessions may be needed to account for variations in the data that have not previously been encountered by the monitoring system. There are statistical and artificial intelligence methods well known to those skilled in the art that may be employed to establish the limits of normal behavior from data collected during the learning or training period.

As discussed herein, the PdM database will define the persistence requirements for each test site. This is an important feature toward reducing false alarms and storing unnecessary video recording. Something as simple as a person or a vehicle crossing the line of sight or obstructing the view between the DAU and the equipment under test will generate false alarms. The detection of fundamental changes in the scene being monitored can be accomplished by performing a correlation of a frame collected during baseline measures and the current scene available to the DAU. This check could be done before data is collected as a precursor to initiating the detailed survey of the equipment under test or as test quality check when suspect conditions are detected. In the event that the scene in the FoV shows significant deviation from the baseline scene, the test will not be completed and a note of this issue with the distorted image will be logged.

Finally, when the suspect condition is found to persist as specified in the monitoring requirements, test data must be compared against the last survey collected to determine if there have been significant changes. If not, then the alarm conditions are noted as substantially unchanged and only summary data are stored, but no video data is retained. If significant changes are detected, then this is noted and all data including the video data is stored.

The PdM database will normally have the monitored plant equipment broken up into many surveys with their own schedule and repeat interval. The large amount of storage required when retaining video recordings will mean that the complete PdM database cannot be retained onboard DAUs. However DAUs will reload the setup information and alarm limits in the PdM database as well as data from the baseline and latest survey measurements for the next scheduled survey. These mobile DAUs must return to their home station on a regular basis to recharge their batteries and data communications could occur at this point or in the field through wireless communications as the different test sites are completed or at the next opportunity when a communications link is available. Field transmissions are preferable since they provide real time status of the survey in progress.

In some embodiments, it would be possible to retain all of the video data and other survey measurements onboard the DAU as storage options continue to improve. In this scenario, the processing to determine if the complete set of measurement data is to be retained in the PdM database could be done by the DAU prior to transfer at the home base or even on the central PdM server. The processing techniques to screen the data and determine if the full data set or a simplified summary is retained would be identical regardless of when and where this processing is applied.

In situations where a fleet of mobile DAUs are available to perform the monitoring tasks, the central PdM operations system, i.e., central PdM server which is operatively connected to the master PdM database, maintains a status chart of each DAU and determines which survey tasks are assigned to a specific DAU based on various factors. These factors may include, but are not necessarily limited to, availability, amount of run time logged for the unit, and the current battery charge. If DAUs differ in the sensor payload mounted, then the central PdM operations system will select the DAU which has the correct sensor payload for the survey task under consideration. The central PdM operations system performs other tasks, including but not limited to scheduling DAUs for periodic maintenance and calibration checks; alerting technicians when DAUs have been damaged, stranded in the field, or have failed to complete their assigned PdM survey tasks; and applying optimization logic to the fleet of DAUs in an effort to the maximize the amount of survey tasks performed and the service life of the DAUs.

Figure 7A:
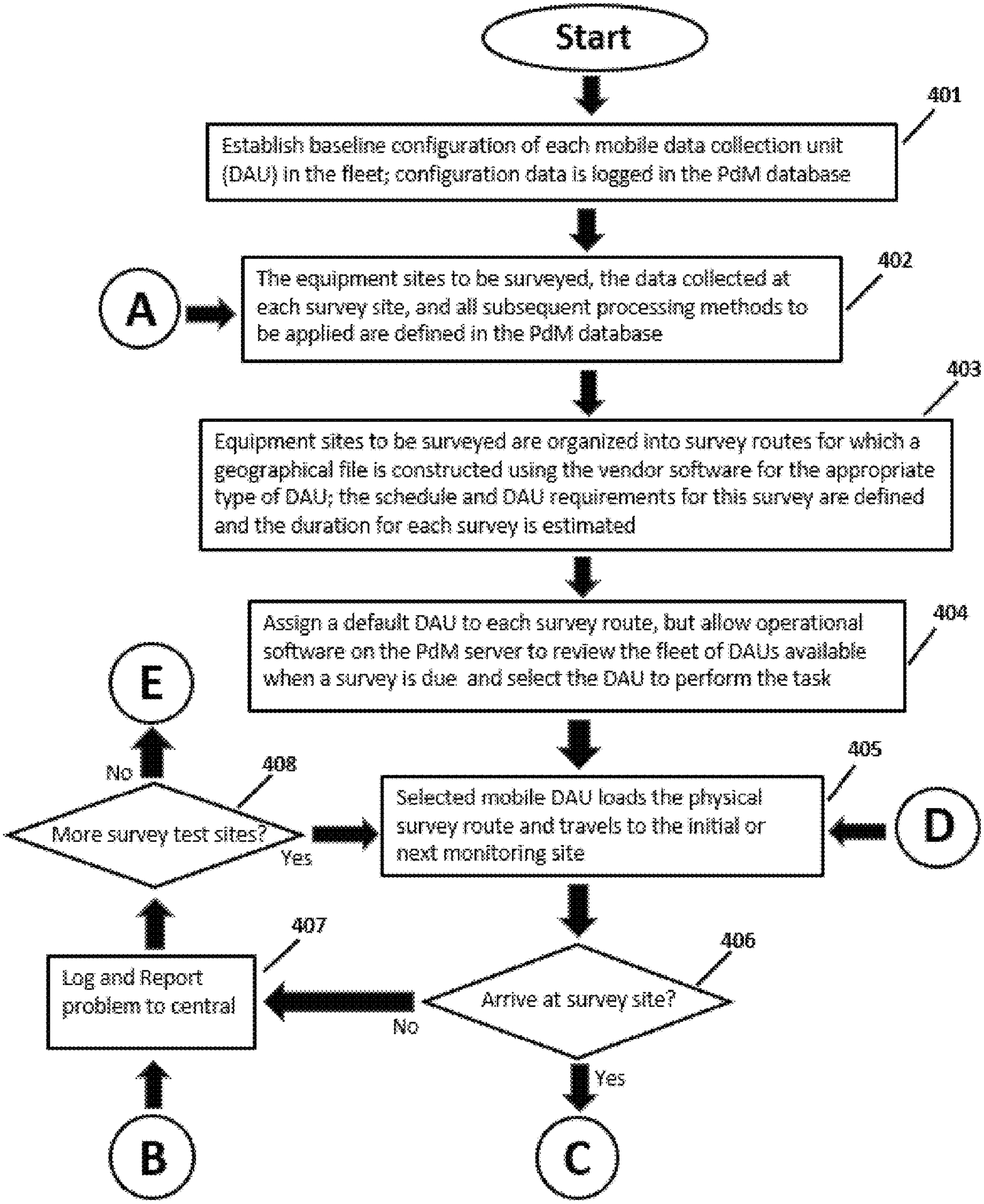
FIG. 7A-B is a flowchart for optimizing the use of the DAU fleet in a PdM program.
Figure 7B:
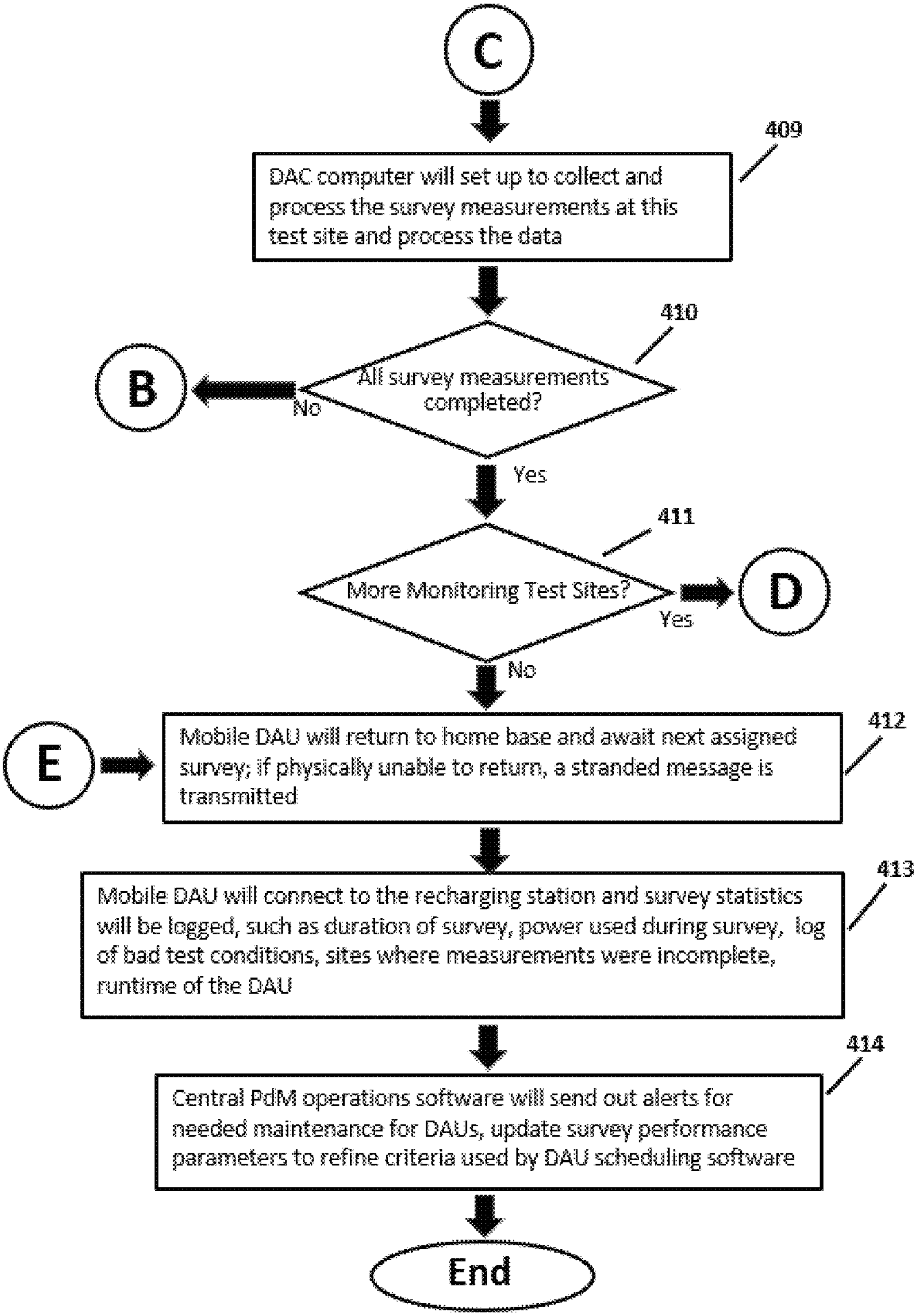

An exemplary process for optimizing the use of the DAU fleet is outlined in a flowchart in FIGS. 7A-B. The information required to manage the use of the DAU fleet is stored in the PdM database and the functions outlined in the flowchart are embodied in the operational software that runs on the central PdM server. The configuration of each of the DAUs in the fleet must be established, including mobile capability and range, sensor payload, runtime hours, current operational state, any previous maintenance actions required, battery capacity, battery level, and current state of readiness as defined in step 401. The equipment sites to be surveyed, the data collected at each survey site, and all subsequent processing methods to be applied are initially defined in Step 402 and updated as the requirements of the PdM program are refined over time. The equipment sites to be surveyed are organized into survey routes, and a survey schedule and applicable DAU requirements are defined and stored in the PdM database in step 403. This step may include using the vendor software for the appropriate type of DAU to construct a file that defines the geographical route to be followed to perform the survey and determine the time to navigate the route which is combined with the measurement times to establish an estimated duration for each survey.

In step 404, a particular DAU is assigned by the PdM server, generally by default, to a particular survey route to cover all defined test sites. Although a default assignment is made, step 404 may also allow for operational software executed by the PdM server to select a DAU for a particular survey based on various factors. These may include fleet availability, uniform usage of DAUs in the fleet, and other factors aimed at enabling the survey tasks to be performed in a manner that maximizes the likelihood that the mission requirements will be fulfilled on time, effectively, and efficiently.

In step 405, the selected DAU performs the assigned survey by loading the appropriate route file and moving to the initial or next survey test site. If the DAU does not arrive at the test site (406), then the problem is logged and reported to the central PdM server (407). The DAU will attempt to move to the next site (408) if more exist or return to its home base (412), if physically able to do so. If the DAU does arrive at the survey test site, then it will collect and process the survey measurements for this site in step 409. If all survey measurements are completed (410), then the DAU will attempt to continue on the route or return to its home base as defined in step 412. Otherwise, at step 411 if more monitoring is to occur, the series of steps beginning with step 405 will be repeated. If the DAU arrives at its home base, it will connect to its recharging station and transmit survey statistics, such as duration of survey, power used during survey, notes of bad test conditions, sites where measurements were incomplete, and the current runtime of the DAU as shown in step 413. In final step 414, the central PdM operations software will send out alerts for needed maintenance for the DAU and update survey performance parameters to refine criteria used by DAU scheduling software.

Persons of ordinary skill in this art also will understand that certain conditions or situations may arise that will prevent the mobile DAUs from completing their survey. These may result from low battery power, malfunctions in attempting to position the mobile unit, obstructions, the loss of the ability to maneuver, or physical damage to the DAU. The presence of these conditions would generate a transmission to the central PdM server with location information and an attempt to return to the home base. In some cases, a unit may become stranded, and a distress signal will be generated on a periodic basis to assist with the process of locating its current location.

In some embodiments, additional data may be needed to verify a fault condition or diagnose the specific fault condition. A PdM analyst will be notified that a suspect condition has been detected during or at the conclusion of the survey when the data has been transferred back to the PdM server or in other implementations by a communication directly to the analyst from the DAU as soon as the condition is detected. The analyst has the option of interrupting the survey in progress or sending the DAU back to a survey location and take control of the DAU to acquire additional measurements. The analyst can remotely control the position of the DAU and view the recordings from the camera in real time. The analyst may also take control of the DAU and direct additional measurements to be collected. Once the analyst has completed collecting the desired measurements, the DAU would continue with the survey in progress or return to its home base.

It will be understood that the embodiments described herein are not limited in their application to the details of the teachings and descriptions set forth, or as illustrated in the accompanying figures. Rather, the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. In terms of the descriptions, it will be understood by those having ordinary skill in the art that modifications and variations of these embodiments are reasonably possible in light of the above teachings and descriptions.

What is claimed is:

1. A system for collecting predictive maintenance (PdM) data to establish a condition of a structure or equipment and to determine a possible existence of a suspect condition of the structure or equipment in industrial plants or civil structures that obtains at least one measurement of motion of the structure, equipment or a portion thereof using at least one video acquisition device that acquires the data in a video recording, the video recording comprising video images of the structure, equipment, or portion thereof in motion which are divisible into individual video image frames, and with each individual video image frame being divisible into a plurality of pixels, the system comprising:

a PdM database communicatively coupled to a mobile data acquisition unit (DAU), the PdM database defining one or more areas and types of structures or equipment to be tested and standard monitoring protocols to be used for such testing;

wherein the DAU collects data and is positioned or configured to be positioned to perform surveys on selected spatial areas containing distinct structures, equipment, or portion thereof, the DAU further being configured with an onboard processor and memory for storage of individual video image frames; and a computer program operating in said processor to spatially define a region of interest (ROI) in a field of view (FoV) of the video recording, and respond to a trigger resulting from a sensed condition by autonomously storing in memory any data contained in the video recording after being acquired by the DAU in response to the trigger, wherein each trigger is established by values for one or more parameters associated with the structure, equipment or portion thereof, thereby establishing a baseline of normal behavior of the structure, equipment or portion thereof.

2. The system of claim 1, wherein the trigger is a type of condition chosen from the group amplitude-based condition, frequency-based condition, and pattern-based condition.

3. The system of claim 1, wherein the response of the computer program to the trigger resulting from the sensed condition occurs until the condition associated with the trigger ceases to exist.

4. The system of claim 1, wherein the response of the computer program to the trigger resulting from the sensed condition occurs until user-specified post-trigger data is acquired and stored.

5. The system of claim 1, wherein the spatial areas are user-selected.

6. The system of claim 1, wherein the spatial areas are selections based on machine learning associated with the DAU observing a process associated with the structure, equipment or portion thereof.

7. The system of claim 1, wherein the sensed condition resulting in the trigger is obtained from one or more of a vibration sensor, a thermal sensor, a current sensor, a speed signal, an ultrasonic reading, and a process variable.

8. The system of claim 1, wherein the computer program transfers information about the sensed condition to the PdM server for review by an analyst.

9. A system for collecting predictive maintenance (PdM) data to establish a condition of a structure or equipment and to determine a possible existence of a suspect condition of the structure or equipment in industrial plants or civil structures that obtains at least one measurement of motion of the structure, equipment or a portion thereof using at least one video acquisition device that acquires the data in a video recording, the video recording comprising video images of the structure, equipment, or portion thereof in motion which are divisible into individual video image frames, and with each individual video image frame being divisible into a plurality of pixels, the system comprising:

a PdM database communicatively coupled to a mobile data acquisition unit (DAU), the PdM database defining one or more areas and types of structures or equipment undergoing rotational or reciprocating motion to be tested and standard monitoring protocols to be used for such testing;

wherein the DAU collects data and is positioned or configured to be positioned to perform surveys on selected spatial areas containing distinct structures, equipment, or portion thereof, the DAU further being configured with an onboard processor and memory for storage of individual video image frames; and a computer program operating in said processor to initiate screening by a DAU to characterize a state of the structure, equipment, or portion thereof within one or more of the spatial areas, and capable of controlling execution of testing applicable to the structure, equipment, or portion thereof.

10. The system of claim 9, wherein at least one selected spatial area is specified by user definition or by object recognition, edge detection, or a combination thereof.

11. The system of claim 10, wherein selected spatial areas comprise at least a first and a second spatial area, wherein the second spatial area is within the first spatial area, the second spatial area is specified by the DAU using object recognition, and the DAU confirms without human involvement that the second spatial area contains structure, equipment, or portions thereof for which PdM data will be collected in a future survey.

12. The system of claim 11, wherein the computer program further operates to add a test location to the PdM database specifying the second spatial area as a test location, a route to the second spatial area test location, and at least one test measurement based on the motion of the structure, equipment, or portion thereof to collect in the future survey.

13. The system of claim 9, wherein screening occurs by assessing a frequency spectrum.

14. The system of claim 13, wherein a composite frequency spectrum is constructed as defined in the PdM database, and wherein the computer program screens one or more frequencies present in the composite frequency spectrum.

15. The system of claim 13, wherein the computer program applies a speed determination algorithm to a frequency spectrum established based on the motion of the structure, equipment, or portion thereof.

16. The system of claim 14, wherein a speed value associated with the motion of the structure, equipment, or portion thereof is used to determine the rotational order of the peaks present in the frequency spectrum.

17. The system of claim 9, wherein screening occurs by assessing one or more parameters of a time waveform based on the motion of the structure, equipment, or portion thereof.

18. The system of claim 9, wherein screening occurs by phase readings of the structure, equipment, or portion thereof.

* * * * *